United States Patent
Bacon

(10) Patent No.: US 6,307,538 B1
(45) Date of Patent: Oct. 23, 2001

(54) EMC ENHANCED PERIPHERAL DEVICE

(75) Inventor: Glade B. Bacon, Everett, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/098,967

(22) Filed: Jun. 18, 1998

(51) Int. Cl.[7] .................................................. G09G 5/08
(52) U.S. Cl. .......................... 345/163; 345/161; 345/163; 345/167; 345/168; 463/37; 463/38; 439/131; 439/680
(58) Field of Search ..................................... 345/173, 174, 345/901, 156, 158, 159, 161, 163, 167, 168; 178/18.01, 18.03, 18.07; 439/131, 680, 344; 710/129; 463/37, 38, 36, 44, 45

(56) References Cited

U.S. PATENT DOCUMENTS

| | | | |
|---|---|---|---|
| 4,876,712 | * 10/1989 | Brint et al. | 379/387 |
| 4,972,470 | * 11/1990 | Farago | 713/192 |
| 5,132,871 | * 7/1992 | Densham et al. | 361/685 |
| 5,180,314 | * 1/1993 | Gelin et al. | 439/394 |
| 5,621,363 | * 4/1997 | Ogden et al. | 333/12 |
| 5,668,698 | * 9/1997 | Jozwiak et al. | 361/752 |
| 5,675,813 | * 10/1997 | Holmadahl | 395/750 |
| 5,773,332 | * 6/1998 | Glad | 439/344 |
| 5,850,209 | * 12/1998 | Lemke et al. | 345/156 |
| 5,920,310 | * 7/1999 | Faggin et al. | 345/173 |
| 6,044,428 | * 3/2000 | Rayabhari | 710/129 |
| 6,059,583 | * 5/2000 | Croft et al. | 439/131 |
| 6,086,430 | * 7/2000 | Amoni et al. | 439/680 |
| 6,131,125 | * 10/2000 | Rostoker et al. | 709/250 |
| 6,166,723 | * 12/2000 | Schena et al. | 345/184 |

* cited by examiner

Primary Examiner—Chanh Nguyen
Assistant Examiner—Uchendu O. Anyaso
(74) Attorney, Agent, or Firm—Theodore M. Magee; Westman, Champlin & Kelly, P.A.

(57) ABSTRACT

An input device capable of being connected to a computing device includes a housing having transducer electronics capable of manipulating an electrical signal to indicate movement of a portion of a user. At least one but fewer than four conductors are connected to the transducer electronics, and are each capable of carrying an electrical signal related to the input device. Each of the conductors is coupled to a connector that is capable of being coupled to the computer.

25 Claims, 7 Drawing Sheets

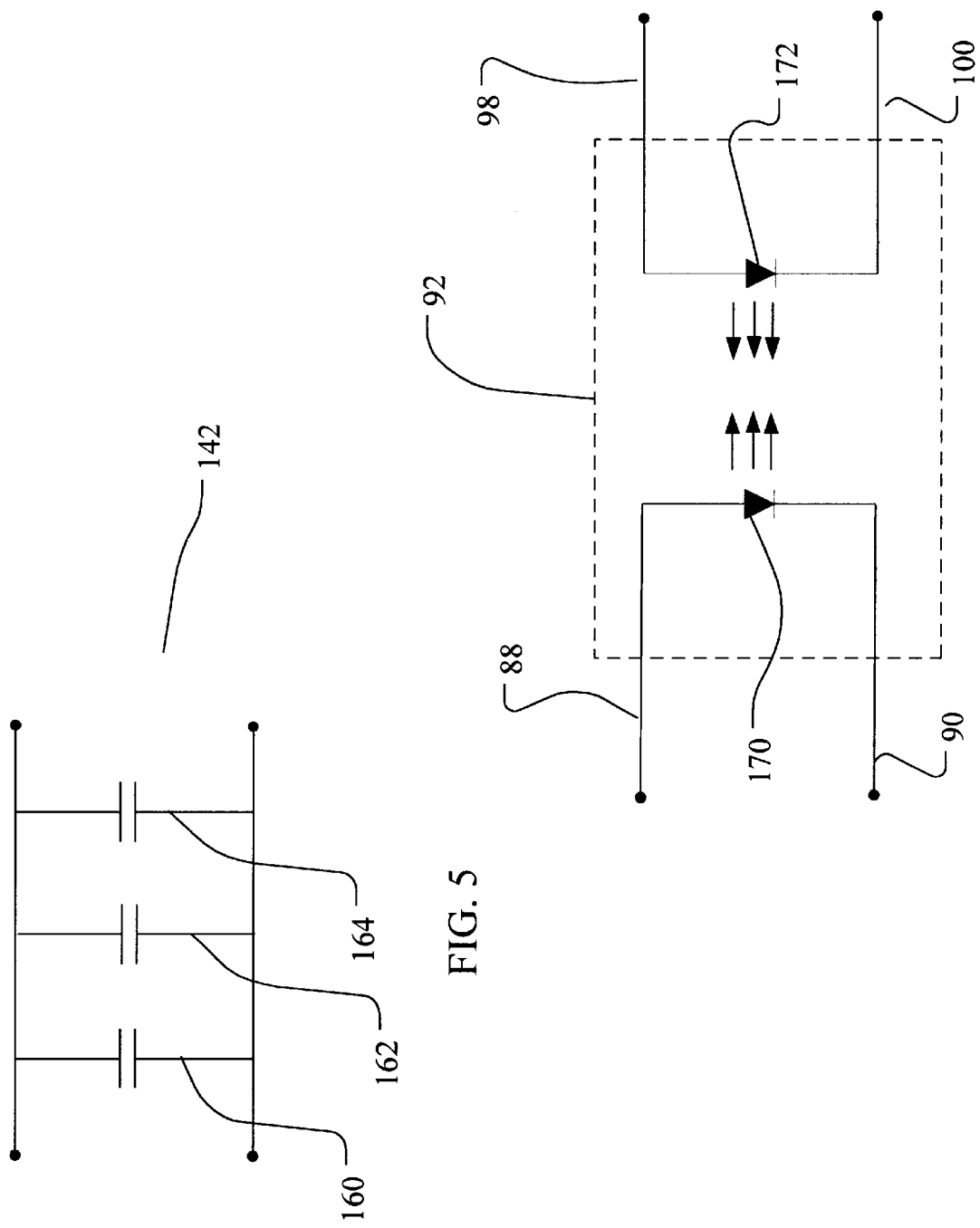

EMC ENHANCED PERIPHERAL DEVICE

BACKGROUND OF THE INVENTION

The present invention relates to electromagnetic compatibility protection for computers. In particular, the present invention relates to electromagnetic compatibility (EMC) for peripheral devices to computers.

Because personal computers (PCs) include a large number of electrical components, they must meet government limitations for electromagnetic susceptibility and electromagnetic emissions. Susceptibility relates to the effects that external electromagnetic signals have on the computer. Emissions relate to electromagnetic radiation produced by the computer.

To reduce a computer's susceptibility and its emissions, the electronics of most computers are shielded within a metal box. Although this shielding reduces the susceptibility and emissions of the computer's internal electronics, it does not provide protection for peripheral devices that are connected to the electronics of the computer via cables. These peripheral devices include a number of devices that track a user's movements such as keyboards, joysticks, game pads, and mice.

These peripheral devices are typically connected to the computer through four conductors. Two of the conductors carry power between the computer and the peripheral device. The other two conductors carry signals to or from the peripheral device.

The four conductors to the peripheral device have a significant susceptibility to electromagnetic events. In particular, the four conductors are susceptible to electro-fast-transient/burst (EFT/B) events. An EFT/B event is a high frequency spike of one kilovolt or more that occurs on one or more of the computer's three input power lines: power, ground, and neutral. Typically, an EFT/B event causes the voltage of the entire computer and its associated peripheral devices to increase rapidly, relative to earth ground.

The four conductors associated with each peripheral device create a high frequency circuit through their parasitic capacitance to ground. In this context, each conductor acts as one plate of the parasitic capacitance. This parasitic capacitance allows high frequency current to flow through the conductors and/or the input device, causing disruption of proper communication between the peripheral device and the PC. This can also disrupt the internal operation of the peripheral device and/or the PC.

The four conductors are also susceptible to electrostatic discharge (ESD) effects by two means. In the case of a direct discharge at the peripheral device, the conductors provide a path from the device to the PC. In the case of indirect application, where the ESD is applied to a coupling plane near the system, ESD energy is coupled to the four conductors via parasitic capacitance and inductance and then conducted to the ends of the conductors. In addition to susceptibility, current input devices are generally unshielded and emit electromagnetic radiation. Most input devices that track a user's hand or eye movement include electronics, operating at moderately high frequency rates, that can generate electromagnetic radiation. In addition, the cable conductors form a parasitic antenna for unintentional radiation of electromagnetic energy. The energy is sourced from both the desired data signals in the cable (and its harmonics), and the parasitic, and generally higher frequency, electronics in the PC and input device.

SUMMARY OF THE INVENTION

An input device capable of being connected to a computing device includes a housing having transducer electronics capable of manipulating an electrical signal to indicate movement of a portion of a user. At least one but fewer than four conductors are connected to the transducer electronics, and are each capable of carrying an electrical signal related to the input device. Each of the conductors is coupled to a connector that is capable of being coupled to the computer.

Aspects of the invention include a connector housing that provides electromagnetic shielding to connector electronics located within the connector housing. In some embodiments of the present invention, the connector electronics are able to send power to the transducer electronics. In these embodiments, the transducer electronics include a storage network capable of storing power provided by the connector electronics. The transducer electronics use the stored power from the storage network when the power signal is not available on the conductor.

In several embodiments of the invention, only two conductors extend between the connector electronics and the transducer electronics.

BRIEF DESCRIPTION OF THE DRAWINGS

FIG. 5 is a circuit diagram of one embodiment of the storage network of FIG. 4.

FIG. 6 is a circuit diagram of one embodiment of the isolator of FIG. 4.

DETAILED DESCRIPTION OF THE PREFERRED EMBODIMENTS

Figure 1:
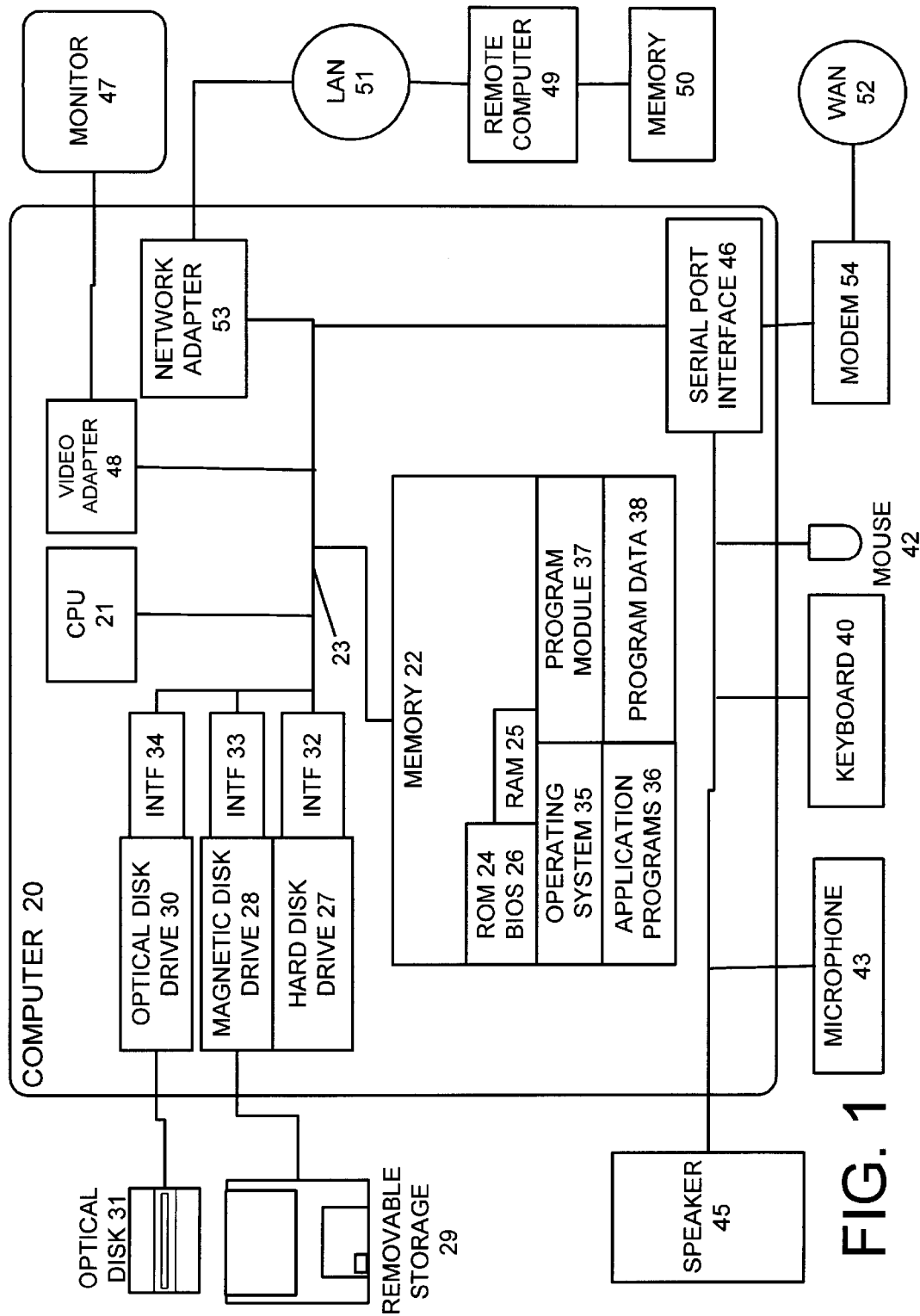
FIG. 1 is a plan diagram of a computing environment for the present invention.

FIG. 1 and the related discussion are intended to provide a brief, general description of a suitable computing environment in which the invention may be implemented. Although not required, the invention will be described, at least in part, in the general context of computer-executable instructions, such as program modules, being executed by a personal computer. Generally, program modules include routine programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit (CPU) 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory 22 includes read only memory (ROM) 24 and random access memory (RAM) 25. A basic input/output (BIOS) 26, containing the basic routine that helps to transfer information between elements within the personal computer 20, such as during start-up, is stored in ROM 24. The personal computer 20 further includes a hard disk drive 27 for reading from and writing to a hard disk (not shown), a magnetic disk drive 28 for reading from or writing to removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, magnetic disk drive interface 33, and an optical drive interface 34, respectively. The drives and the associated computer-readable media provide nonvolatile storage of computer readable instructions, data structures, program modules and other data for the personal computer 20.

Although the exemplary environment described herein employs the hard disk, the removable magnetic disk 29 and the removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memory (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40, pointing device 42 and a microphone 43. Other input devices (not shown) may include a joystick, game pad, satellite dish, scanner, or the like. These and other input devices are often connected to the processing unit 21 through a serial port interface 46 that is coupled to the system bus 23, but may be connected by other interfaces, such as a sound card, a parallel port, a game port or a universal serial bus (USB). A monitor 47 or other type of display device is also connected to the system bus 23 via an interface, such as a video adapter 48. In addition to the monitor 47, personal computers may typically include other peripheral output devices, such as a speaker 45 and printers (not shown).

The personal computer 20 may operate in a networked environment using logic connections to one or more remote computers, such as a remote computer 49. The remote computer 49 may be another personal computer, a hand-held device, a server, a router, a network PC, a peer device or other network node, and typically includes many or all of the elements described above relative to the personal computer 20, although only a memory storage device 50 has been illustrated in FIG. 1. The logic connections depicted in FIG. 1 include a local area network (LAN) 51 and a wide area network (WAN) 52. Such networking environments are commonplace in offices, enterprise-wide computer network Intranets and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a network environment, program modules depicted relative to the personal computer 20, or portions thereof, may be stored in the remote memory storage devices. It will be appreciated that the network connections shown are exemplary and other means of establishing a communications link between the computers may be used. For example, a wireless communication link may be established between one or more portions of the network.

Figure 2:
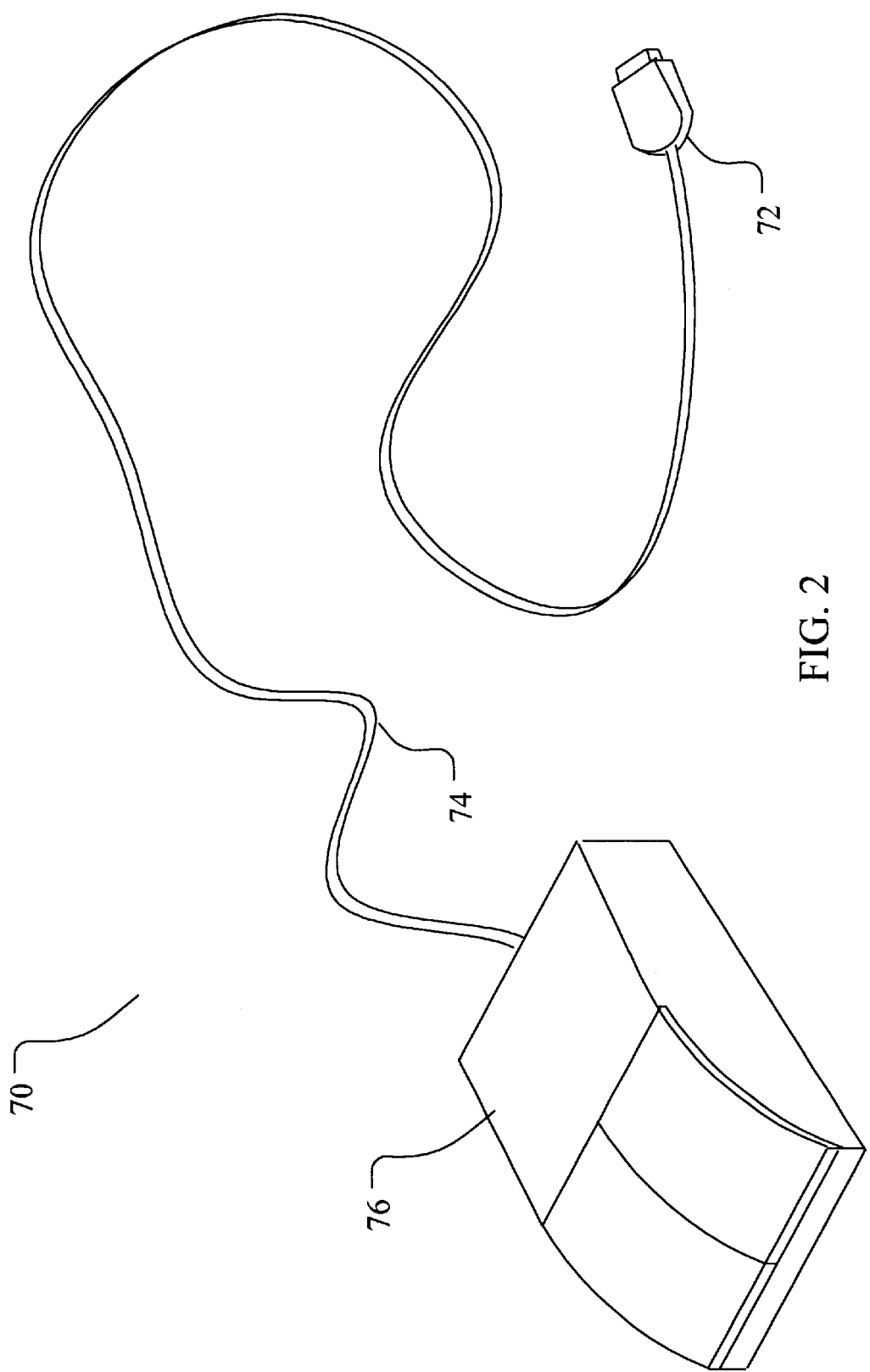
FIG. 2 is a perspective diagram of one type of input device of the present invention.

FIG. 2 shows a perspective view of an input device 70 that includes a connector housing 72, a cable 74, and a device housing 76. In input device 70, device housing 76 takes the form of a mouse. However, those skilled in the art will recognize that device housing 76 may have several different forms, including joysticks, game pads and keyboards. In preferred embodiments of the present invention, cable 74 includes two separate conductors that are insulated from each other.

Figure 3:
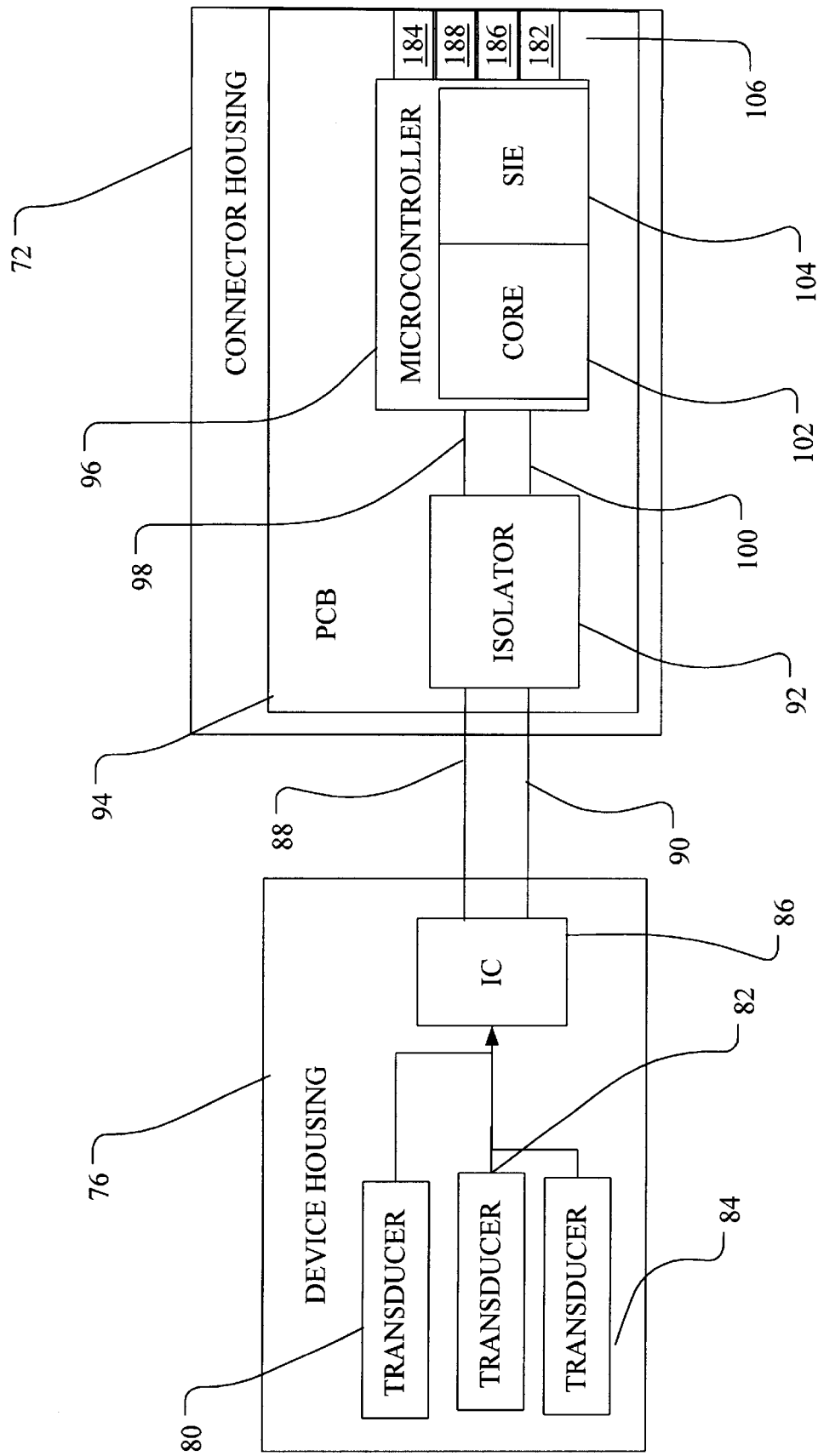
FIG. 3 is a block diagram of an input device of the present invention.

FIG. 3 is a block diagram showing the electronics enclosed within device housing 76 and connector housing 72 of FIG. 2. Although device housing 76 of FIG. 2 depicts a mouse, the description of the electronics for FIG. 3 is equally applicable to other types of peripheral devices.

Within device housing 76, a plurality of transducers 80, 82 and 84 provide analog electrical signals to a transducer integrated circuit 86. The analog signals produced by transducers 80, 82 and 84 are created by the movement of a user. Examples include roller transducers, optical transducers, switches, and piezo-electric materials. Although three transducers are shown in FIG. 3, those skilled in the art will recognize that the number of transducers will change depending on the peripheral device.

Transducer integrated circuit 86 converts the analog signals received from the transducers into digital signals and organizes the various digital signals to produce a serial data stream, which transducer integrated circuit 86 passes to connector electronics within connector housing 72. At a minimum, transducer integrated circuit 86 should provide digital representations of the analog signals from each transducer. The location of each bit of data in the serial packet can be defined to infer its transducer source and value. Although transducer integrated circuit 86 may perform more functions, it is preferred under the present invention that transducer integrated circuit 86 perform the least number of functions possible while still conveying the necessary transducer information. Preferably, transducer integrated circuit 86 operates at a frequency below 64 kilohertz (kHz) and is a state machine architecture instead of a more complex microcontroller architecture.

Transducer integrated circuit 86 sends digital values representative of the transducer signals along two conductors 88 and 90 found within cable 74. Preferably, conductors 88 and 90 together carry a single differential digital signal.

Conductors 88 and 90 are connected to an isolator 92 located within connector housing 72. Isolator 92 resides on a printed circuit board 94 and electrically isolates conductors 88 and 90 from the remainder of the connector electronics in connector housing 72. Isolator 92 is optional. EMC performance improvements can be obtained without it, in which case conductors 88 and 90 connect directly to microcontroller 96.

Isolator 92 is connected to microcontroller 96 by two conduction lines 98 and 100. Microcontroller 96 preferably resides on the same printed circuit 94 as isolator 92 and includes a microcontroller core 102 and in preferred embodiments a serial interface engine 104.

Serial interface engine 104 is used in embodiments of the present invention where the connection between the computer and the peripheral device is made across a serial line. In such embodiments, the information produced by microcontroller core 102 is passed through serial interface engine 104, which converts the parallel digital information of microcontroller core 102 into serial digital information.

Microcontroller 96 is connected to a set of connector plugs 106 that may be plugged into computer 20 of FIG. 1. The set of connector plugs 106 preferably includes terminal 184 for a positive power supply, terminal 182 for ground and terminals 186 and 188 for data. However, the set of connector plugs 106 may include additional terminals.

The peripheral device of FIG. 3 differs substantially from peripheral devices of the prior art. In particular, prior art peripheral devices do not include integrate circuits within the connector housing. Instead, prior art peripheral devices include microcontrollers within the device housing. By locating microcontroller 96 within connector housing 72, the present invention allows the microcontroller to operate without producing high frequency external electromagnetic fields. Although microcontroller 96 does produce electromagnetic fields, these fields are shielded from the external atmosphere by connector housing 72, which in preferred embodiments includes a metallic layer.

In addition, since transducer integrated circuit 86 found within device housing 76 operates at a frequency below 64 kHz, communications between transducer integrated circuit 86 and microcontroller 96 are below 64 kHz. Thus, the data signals transmitted between transducer integrated circuit 86 and microcontroller 96 will not cause conductors 88 and 90 to emit high frequency electromagnetic radiation.

An additional benefit of including microcontroller 96 within connector housing 72 is that it reduces the power requirements of the electronics located in device housing 76. In fact, with the lower power requirements, it is possible under the present invention to multiplex power signals and data signals between device housing 76 and connector housing 72, thereby reducing the number of required conductors from four to two. This reduction is possible because the multiplexing allows power and data to be carried along two conductors instead of having two conductors carry power and two conductors carry data. One example of such multiplexing is described further below.

Figure 4:
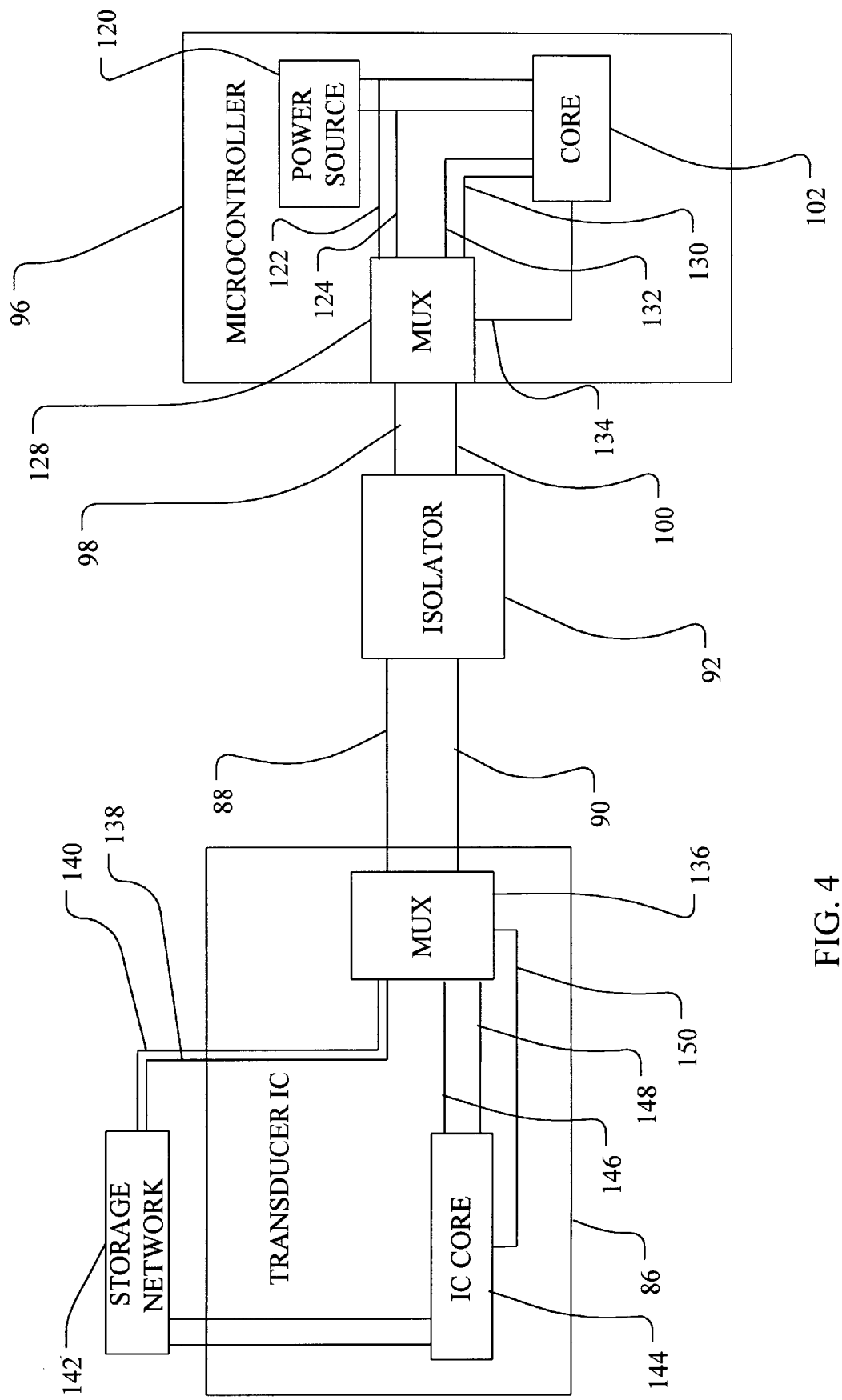
FIG. 4 is a more detailed block diagram of the transducer integrated circuit and the connector integrated circuit of FIG. 3.

FIG. 4 shows a more detailed block diagram of one embodiment of transducer integrated circuit 86 and microcontroller 96 of FIG. 3. The embodiment of FIG. 4 provides power to the peripheral device by time-multiplexing a power signal with data signals. In microcontroller 96, a power source 120 provides a power line 122 and a ground line 124 to microcontroller core 102 and a multiplexer 128. Microcontroller core 102 is connected to multiplexer 128 by two data lines 130 and 132, and a control line 134. Multiplexer 128 is connected to conductors 98 and 100 that are further connected to isolator 92.

Through control line 134, microcontroller core 102 is able to control the connections made by multiplexer 128. Based on the signal it receives along control line 134, multiplexer 128 either connects conductors 88 and 90 to power line 122 and ground line 124, respectively, or to data lines 130 and 132, respectively.

Conductors 88 and 90 extend from isolator 92 to multiplexer 136 of transducer integrated circuit 86. Multiplexer 136 is connected to a storage network 142 by a power line 140 and a ground line 138. Multiplexer 136 is also connected to an integrated circuit (IC) core 144 by two data lines 146 and 148. Integrated circuit core 144 controls multiplexer 136 through a control line 150. Based on the signal on control line 150, multiplexer 136 either connects conductors 88 and 90 to power line 140 and ground line 138, respectively, or to data lines 148 and 146, respectively.

In operation, the states of multiplexers 136 and 128 are coordinated. Thus, when multiplexer 128 connects power line 122 and ground line 124 to conductors 98 and 100, respectively, multiplexer 136 connects conductors 88 and 90 to power line 140 and ground line 138, respectively. This allows power to be transferred to transducer integrated circuit 86. When multiplexer 128 connects data lines 132 and 130 to conductors 98 and 100, respectively, multiplexer 136 connects conductors 88 and 90 to data lines 148 and 146, respectively. This allows data to be transferred between transducer integrated circuit 86 and microcontroller core 102.

The synchronization of the multiplex switching can be achieved in a number of ways. In one embodiment, the electronics in device housing 76 and connector 72 have predefined time periods for providing power to the housing and for transferring data to or from the housing. These time periods have tolerances to accommodate clock circuit discrepancies. Each set of electronics synchronizes on the start and/or end of each data packet. When needed, null data packets are sent to maintain synchronization.

In an alternative embodiment, the switching of the multiplexers can be controlled by integrated circuit core 144 based on power levels provided by storage network 142. As described below, storage network 142 stores charge delivered along power line 140 and ground line 138 and provides the stored charge to integrated circuit core 144 when multiplexer 136 is using conductors 88 and 90 for data transfer. When the power provided by storage network 142 drops below a predetermined level, integrated circuit core 144 issues an interrupt to microcontroller core 102 indicating that multiplexers 128 and 136 should be switched to make power connections for a prescribed time interval. The time interval is either transmitted by integrated circuit core 144 or is stored within both microcontroller core 102 and integrated circuit core 144.

In other embodiments of the present invention, the device electronics are powered directly from a data signal produced by microcontroller core 102. In such embodiments, a portion of the power that is found in the data signal itself is used to power the device electronics.

FIG. 5 is a circuit diagram of one embodiment of storage network 142 of FIG. 4. In FIG. 5, storage network 142 includes a set of parallel capacitors 160, 162 and 164. The charge storage capacity of these parallel capacitors is additive. As those skilled in the art will recognize, the total capacitance of storage network 142 can be chosen depending on the performance characteristics desired from the storage network. Specifically, a larger capacitance will provide power for a longer amount of time, but will require more time to recharge. Conversely, a smaller capacitance will recharge quickly but will provide power for short periods of time.

Although capacitors have been shown in FIG. 5, those skilled in the art will recognize that other charged storage devices such as rechargeable batteries may be used in place of the capacitors.

FIG. 6 shows one embodiment of isolator circuit 92 of FIG. 4. In the embodiment of FIG. 6, conductors 88 and 90 are connected together by a photo-transceiver 170, and conductors 98 and 100 are connected together by a photo-transceiver 172. In operation, a current flowing from conductor 98 to conductor 100 causes photo-transceiver 172 to emit photons that strike photo-transceiver 170. In response to the photons, photo-transceiver 170 generates a current that is conducted along conductors 88 and 90. Conversely, a current flowing in conductors 88 and 90 causes photo-transceiver 170 to emit photons that strike photo-transceiver 172, thereby creating a current in conductors 98 and 100.

Isolator 9 attenuates large-scale electrical disturbances that would otherwise pass between conductor pairs 88, 90 and 98, 100. Therefore, an electrostatic discharge at device housing 76 will have a limited ability to reach microcontroller 96 or terminals 182, 184, 186, and 188, which connect to a port of the computer.

Figure 7:
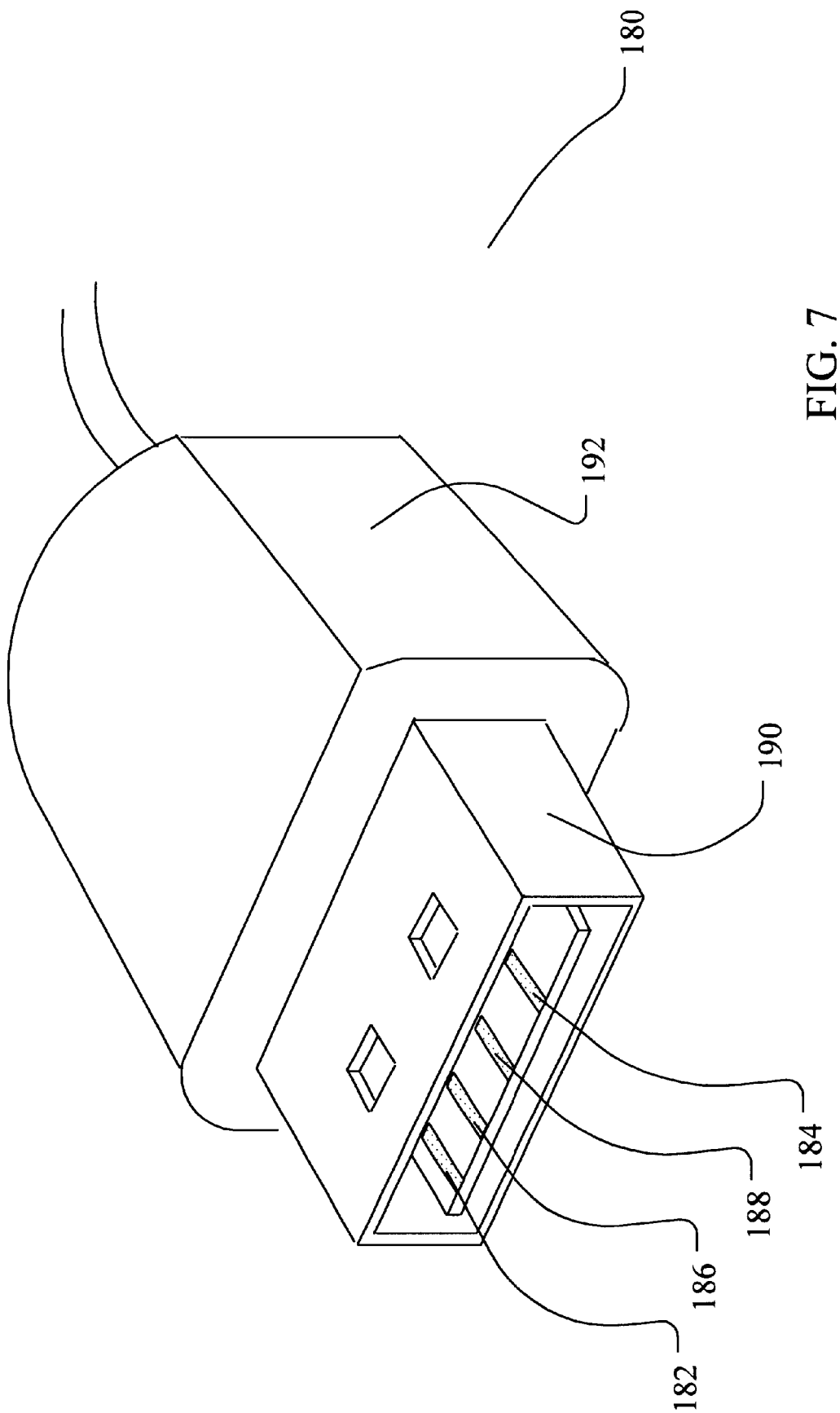
FIG. 7 is a perspective view of a USB connector used with the present invention.

FIG. 7 provides a perspective diagram of a connector housing 180, which is one embodiment of connector housing 72 of FIG. 3. Specifically, connector housing 180 is known in the art as a Universal Serial Bus (USB) connector. Connector 180 includes a positive power terminal 184, a ground terminal 182, a positive data terminal 186 and a negative data terminal 188. Each of the terminals 182, 184, 186 and 188 is located within a metal shield 190 that is partially encased by a plastic covering 192.

Figure 8:
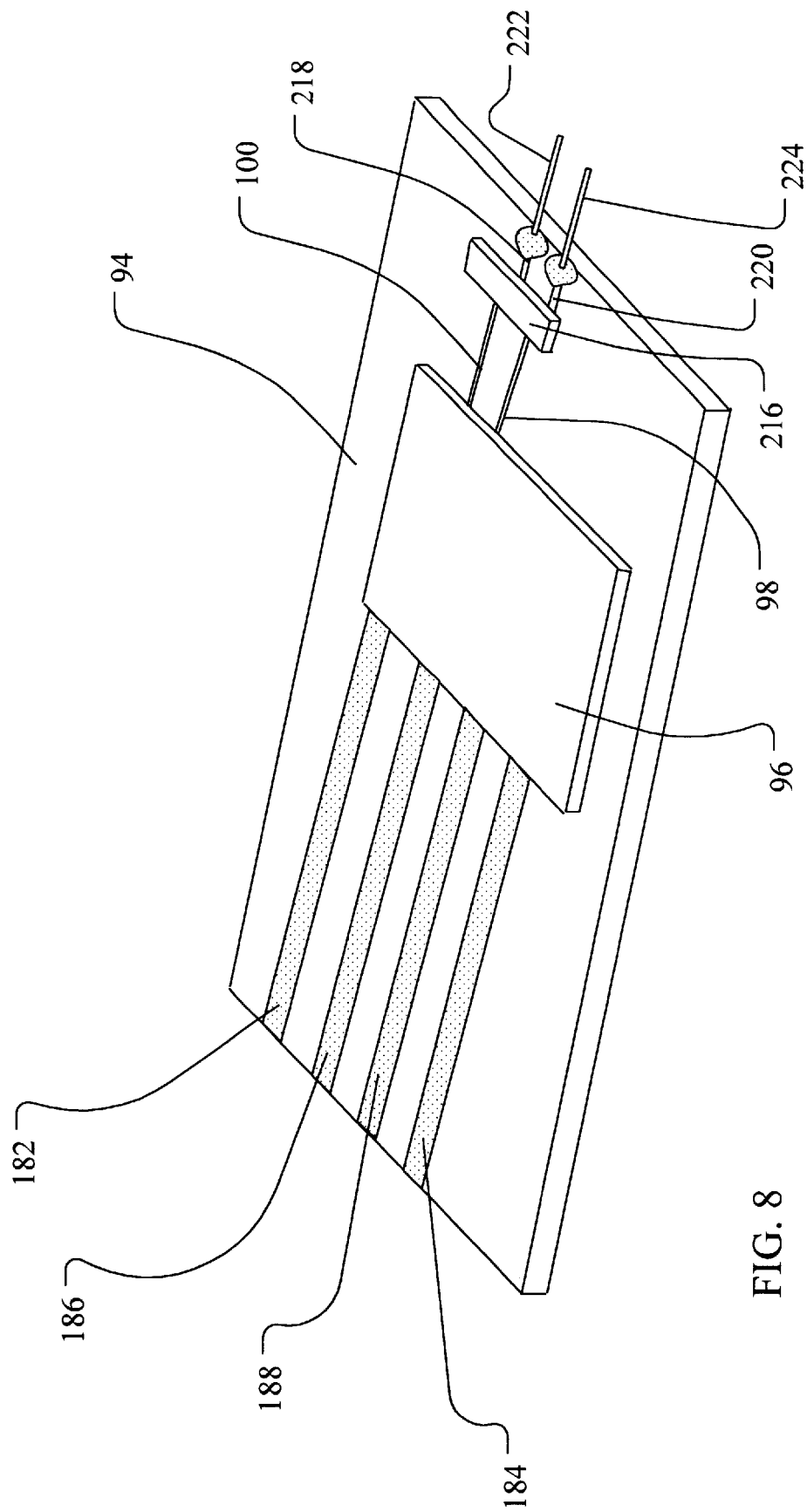
FIG. 8 is a perspective view of a printed circuit board of the USB connector of FIG. 7.

FIG. 8 is a perspective view of printed circuit board 94 of FIG. 3. Printed circuit board 94 is internal to connector 180 of FIG. 7. Terminals 182, 184, 186 and 188 are preferably deposited on printed circuit board 94. Terminals 182, 184, 186, and 188 are also electrically connected to microcontroller 96.

Microcontroller 96 is attached to printed circuit board 94 and includes additional electric connections to conductive traces 98 and 100. Conductive traces 98 and 100 form electrical connections with isolator 92 that forms additional electrical connections to conductive traces 218 and 220. Electrical traces 218 and 220 are electrically coupled to conductors 222 and 224, preferably by soldering conductors 222 and 224 to electrical traces 218 and 220. Together, electrical trace 218 and conductor 222 form part of conductor 88 of FIGS. 3 and 4. Similarly, electrical trace 220 and conductor 224 from part of conductor 90 of FIGS. 3 and 4.

Within connector 180, printed circuit board 94 and its electronics are encased within metal shield 190, which provides electromagnetic shielding from external electromagnetic radiation. Metal shield 190 also prevents the release of electromagnetic radiation generated by microcontroller 96.

A complimentary benefit of this invention is the EMC protection of I/O lines from the host PC. In prior art implementations, four conductors travel from inside the host PC through the connector, down the cable, and into the peripheral device housing. This topology has EMC performance disadvantages when compared to the present invention. For example, in the prior art, undesired signals induced onto the four wires are directly conducted into the host PC, where they can inhibit proper operation or cause permanent damage. In addition, the conductors form a parasitic capacitance through which noise current flows during electric fast transient/burst (EFT/B) testing. Cable shielding reduces these undesirable effects, but is not a complete solution. By limiting the length of the conductors exiting the host PC and enclosing them in the connector shield, the present invention provides a significantly higher level of isolation from EMC problems.

Microcontroller 96 can be attached to printed circuit board 94 through any known printed circuit board technique such as through-hole, surface mount and chip-on-board.

Although the present invention has been described with reference to preferred embodiments, workers skilled in the art will recognize that changes may be made in form and detail without departing from the spirit and scope of the invention.

What is claimed is:

1. An input device capable of being connected to a computing device, the input device comprising:
   a housing;
   transducer electronics located in the housing and capable of manipulating an electrical signal to indicate movement of a portion of a user;
   at least one but fewer than four conductors connected to the transducer electronics, each conductor capable of carrying an electrical signal relative to the input device; and
   a connector, coupled to each of the conductors and capable of being coupled to the computing device.

2. The input device of claim 1 wherein there are two conductors connected between the connector and the transducer.

3. The input device of claim 1 wherein the connector comprises a connector integrated circuit capable of providing an interface between the computing device and the conductors.

4. The input device of claim 3 wherein the connector integrated circuit comprises a microcontroller.

5. The input device of claim 4 wherein the microcontroller comprises:
   a serial interface engine coupled to the computing device; and
   an internal integrated circuit coupled to the conductors.

6. The input device of claim 3 wherein the connector integrated circuit comprises a state machine.

7. The input device of claim 3 wherein the connector integrated circuit is capable of providing power to the input device along the conductors.

8. The input device of claim 7 wherein the transducer electronics comprises a storage network capable of storing power received from the connector integrated circuit.

9. The input device of claim 8 wherein the transducer electronics are capable of acquiring power from the storage network when the connector integrated circuit is not providing a power signal along the conductors.

10. The input device of claim 8 wherein the storage network comprises a capacitor.

11. The input device of claim 3 wherein the connector further comprises electromagnetic shielding generally surrounding the connector integrated circuit and capable of protecting the integrated circuit from electromagnetic radiation.

12. The input device of claim 11 wherein the electromagnetic shielding is capable of protecting input lines to the computing device from electromagnetic radiation.

13. A peripheral device capable of being connected to a computer, the peripheral device comprising:
   a device housing;
   at least one conductor mounted within a cable that is external to the computer, the conductor having a first end terminating in the device housing and a second end;
   a connector housing separate from the device housing, the second end of the conductor terminating in the connector housing; and an integrated circuit located within the connector housing and coupled to the second end of the conductor through an isolation device, the integrated circuit capable of being coupled to the computer.

14. The peripheral device of claim 13 wherein the connector housing provides a uniform serial bus connection.

15. The peripheral device of claim 13 wherein the connector housing is capable of shielding the integrated circuit from electromagnetic interference.

16. The peripheral device of claim 13 wherein only two conductors extend from the device housing to the connector housing.

17. The peripheral device of claim 13 further comprising a device integrated circuit located within the device housing.

18. The peripheral device of claim 17 wherein the device integrated circuit operates at a lower frequency than the integrated circuit located within the connector housing.

19. The peripheral device of claim 13 wherein the isolation device comprises at least two optical transceivers that are optically coupled together but electrically isolated from each other.

20. A peripheral device capable of being coupled to a computing device, the peripheral device comprising:

a device housing;

device electronics located in the device housing;

a conductor having a first end coupled to the device electronics and a second end;

a connector housing; and connector electronics located in the connector housing and coupled to the second end of the conductor, the connector electronics and device electronics capable of time multiplexing a power signal from the connector electronics with a data signal.

21. The peripheral device of claim 19 wherein the connector electronics comprise an integrated circuit.

22. The peripheral device of claim 19 wherein the connector housing shields the connector electronics from electromagnetic interference.

23. The peripheral device of claim 19 wherein the connector housing shields input/output lines to the computing device from electromagnetic interference.

24. The peripheral device of claim 21 wherein the device electronics operate at a lower frequency than the connector electronics.

25. The peripheral device of claim 19 wherein at most two conductors extend between the device electronics and the connector electronics.

* * * * *

UNITED STATES PATENT AND TRADEMARK OFFICE
CERTIFICATE OF CORRECTION

PATENT NO. : 6,307,538 B1
DATED : October 23, 2001
INVENTOR(S) : Bacon

It is certified that error appears in the above-identified patent and that said Letters Patent is hereby corrected as shown below:

Column 7,
Line 13, replace "9" with -- 92 --.

Column 10,
Lines 10, 12, 15, 18 and 21, replace "19" with -- 20 --.

Signed and Sealed this

Twenty-seventh Day of August, 2002

Attest:

Attesting Officer

JAMES E. ROGAN
Director of the United States Patent and Trademark Office